(12) United States Patent
Tsarfati

(10) Patent No.: US 7,069,546 B2
(45) Date of Patent: Jun. 27, 2006

(54) GENERIC FRAMEWORK FOR EMBEDDED SOFTWARE DEVELOPMENT

(75) Inventor: Yoram Tsarfati, Bet Hanania (IL)

(73) Assignee: Corrigent Systems Ltd., Tel Aviv (IL)

( * ) Notice: Subject to any disclaimer, the term of this patent is extended or adjusted under 35 U.S.C. 154(b) by 637 days.

(21) Appl. No.: 10/005,030

(22) Filed: Dec. 3, 2001

(65) Prior Publication Data

US 2003/0105886 A1   Jun. 5, 2003

(51) Int. Cl.
*G06F 9/45*    (2006.01)

(52) U.S. Cl. .................. 717/149; 717/150; 719/318; 719/328

(58) Field of Classification Search ........ 717/149–161, 717/140, 100–109, 143, 110, 172; 713/1; 719/328, 318; 709/223, 318; 714/57, 49; 345/765; 385/16; 707/10; 370/254; 379/201.01; 718/318, 328
See application file for complete search history.

(56) References Cited

U.S. PATENT DOCUMENTS

| | | | | |
|---|---|---|---|---|
| 5,159,687 A | * | 10/1992 | Richburg | 717/106 |
| 5,278,986 A | * | 1/1994 | Jourdenais et al. | 717/149 |
| 5,504,903 A | * | 4/1996 | Chen et al. | 713/1 |
| 5,933,641 A | * | 8/1999 | Ma | 717/143 |
| 6,081,665 A | * | 6/2000 | Nilsen et al. | 717/116 |
| 6,163,812 A | * | 12/2000 | Gopal et al. | 719/310 |
| 6,182,157 B1 | * | 1/2001 | Schlener et al. | 719/318 |
| 6,192,514 B1 | * | 2/2001 | Lurndal | 717/149 |
| 6,243,809 B1 | * | 6/2001 | Gibbons et al. | 713/1 |
| 6,260,077 B1 | * | 7/2001 | Rangarajan et al. | 719/328 |
| 6,502,213 B1 | * | 12/2002 | Bowman-Amuah | 714/49 |
| 6,609,128 B1 | * | 8/2003 | Underwood | 707/10 |
| 6,701,513 B1 | * | 3/2004 | Bailey | 717/109 |
| 6,718,535 B1 | * | 4/2004 | Underwood | 717/101 |
| 6,724,875 B1 | * | 4/2004 | Adams et al. | 379/201.01 |
| 2001/0052006 A1 | * | 12/2001 | Barker et al. | 709/223 |
| 2002/0010908 A1 | * | 1/2002 | Cheng et al. | 717/2 |
| 2002/0112227 A1 | * | 8/2002 | Kramskoy et al. | 717/148 |
| 2002/0133812 A1 | * | 9/2002 | Little et al. | 717/140 |
| 2003/0009711 A1 | * | 1/2003 | Kuhn et al. | 714/57 |
| 2003/0023950 A1 | * | 1/2003 | Ma et al. | 717/102 |
| 2003/0037171 A1 | * | 2/2003 | Madineni et al. | 709/310 |
| 2003/0058277 A1 | * | 3/2003 | Bowman-Amuah | 345/765 |
| 2003/0084434 A1 | * | 5/2003 | Ren | 717/172 |
| 2003/0091267 A1 | * | 5/2003 | Alvarez et al. | 385/16 |
| 2003/0135842 A1 | * | 7/2003 | Frey et al. | 717/121 |

(Continued)

OTHER PUBLICATIONS

Bell et al., Bridging the gap between embedded test and ATE, Test Conference, 2000. Proceedings. International, Oct. 3-5, 2000, pp.: 55-63.*

(Continued)

*Primary Examiner*—Wei Zhen
*Assistant Examiner*—Satish S. Rampuria
(74) *Attorney, Agent, or Firm*—Abelman, Frayne & Schwab

(57) ABSTRACT

A method for producing embedded software includes providing one or more generic application handler programs, each such program comprising computer program code for performing generic application functions common to multiple types of hardware modules used in a communication system. Specific application handler code is generated to associate the generic application functions with specific functions of a device driver for at least one of the types of the hardware modules. The generic application handler programs are compiled together with the specific application handler code to produce machine-readable code to be executed by an embedded processor in the at least one of the types of the hardware modules.

45 Claims, 7 Drawing Sheets

U.S. PATENT DOCUMENTS

| | | | |
|---|---|---|---|
| 2003/0161296 A1* | 8/2003 | Butler et al. | 370/352 |
| 2003/0212983 A1* | 11/2003 | Tinker | 717/110 |
| 2004/0015809 A1* | 1/2004 | Cheng | 717/100 |
| 2004/0015832 A1* | 1/2004 | Stapp et al. | 717/106 |
| 2004/0031030 A1* | 2/2004 | Kidder et al. | 717/172 |
| 2005/0078611 A1* | 4/2005 | Adams et al. | 370/254 |

OTHER PUBLICATIONS

Leupers, Code generation for embedded processors, System Synthesis, 2000. Proceedings. The 13th International Symposium on , Sep. 20-22, 2000, pp.: 173-178.*

Gauthier et al, Automatic generation and targeting of application-specific operating systems and embedded systems software, Computer-Aided Design of Integrated Circuits and Systems, IEEE Transactions on, vol.: 20, Issue: 11 , Nov. 2001, pp.: 1293-1301.*

Sun.com Solstice Telecommnications Management, Oct. 17, 2001, www.sun.com/software.../index.html, pp. 1-21.*

Daniells, Resilient Message Handler, IEEE, Dec. 10, 1990 pp.: 4/1-4/3.*

Bhoedjang et al., Friendly and efficient message handling, IEEE, Jan. 3-6, 1996 pp.: 121-130 vol. 1.*

Govindarajan, Exception handlers in functional programming languages, IEEE, vol. 19, Issue 8, Aug. 1993 pp.: 826-834.* http://www.jungo.com/index.html. Oct. 17, 2001.

http://www.sun.com/softw.../index.html. Oct. 17, 2001.

* cited by examiner

GENERIC FRAMEWORK FOR EMBEDDED SOFTWARE DEVELOPMENT

COMPUTER PROGRAM LISTING APPENDIX

A computer program listing appendix is submitted herewith on one compact disc and one duplicate compact disc. The total number of compact discs including duplicates is two. The files on the compact disc are ASCII text files in which the characters are displayed as their corresponding values in hexadecimal format. The listing contains 26 files of C-language source code, which are arranged in sub-directories of the main directory Patent_Generic_Handlers\Generic_LC_SW Example. Their names, dates of creation, directory locations, and sizes in bytes are as follows:

Alarm.cpp of Nov. 4, 2001, located in folder \Alarm_Handler\appl\src\ and of length 14,042 bytes.
AlarmPrio.h of Nov. 4, 2001, located in folder \Alarm_Handler\ext_inc\ and of length 14,219 bytes.
AlarmType.h of Nov. 4, 2001, located in folder \Alarm_Handler\ext_inc\ and of length 3,363 bytes.
AlarmHdr.h of Nov. 4, 2001, located in folder \Alarm_Handler\gen\inc\ and of length 11,033 bytes.
GenAlarmMn.cpp of Nov. 4, 2001, located in folder \Alarm_Handler\gen\src\ and of length 99,651 bytes.
Alarm.h of Nov. 4, 2001, located in folder \ext_inc\ and of length 19,293 bytes.
AlarmType.h of Nov. 4, 2001, located in folder \ext_inc\ and of length 3,363 bytes.
cs_types.h of Nov. 4, 2001, located in folder \ext_inc\ and of length 21,712 bytes.
genconf.h of Nov. 4, 2001, located in folder \ext_inc\ and of length 14,986 bytes.
genMainHandler.h of Nov. 4, 2001, located in folder \ext_inc\ and of length 6,903 bytes.
genMaint.h of Nov. 4, 2001, located in folder \ext_inc\ and of length 11,269 bytes.
genPM.h of Nov. 4, 2001, located in folder \ext_inc\ and of length 15,399 bytes.
ver.h of Nov. 4, 2001, located in folder \ext_inc\ and of length 4,189 bytes.
mainHandler.cpp of Nov. 4, 2001, located in folder \Main\appl\src\ and of length 12,272 bytes.
mainHandler.h of Nov. 4, 2001, located in folder \Main\ext_inc\ and of length 8,083 bytes.
genMainHandler.cpp of Nov. 4, 2001, located in folder \Main\gen\src\ and of length 18,939 bytes.
maint.cpp of Nov. 4, 2001, located in folder \Maint_Handler\appl\src\ and of length 27,966 bytes.
maint.h of Nov. 4, 2001, located in folder \Maint_Handler\ext_inc\ and of length 11,800 bytes.
maint_type.h of Nov. 4, 2001, located in folder \Maint_Handler\gen\inc\ and of length 10,089 bytes.
genMaint.cpp of Nov. 4, 2001, located in folder \Maint_Handler\gen\src\ and of length 67,850 bytes.
PM.cpp of Nov. 4, 2001, located in folder \PM_Handler\appl\src\ and of length 60,711 bytes.
PM.h of Nov. 4, 2001, located in folder \PM_Handler\ext_inc\ and of length 20,060 bytes.
genPMDB.h of Nov. 4, 2001, located in folder \PM_Handler\gen\inc\ and of length 10,797 bytes.
inc_genPM.h of Nov. 4, 2001, located in folder \PM_Handler\gen\inc\ and of length 8,732 bytes.
genPM.cpp of Nov. 4, 2001, located in folder \PM_Handler\gen\src\ and of length 69,561 bytes.
genPMDB.cpp of Nov. 4, 2001, located in folder \PM_Handler\gen\src\ and of length 37,819 bytes.

These files are incorporated herein by reference in their entirety. The files contain copyright material owned by Corrigent Systems Ltd.

FIELD OF THE INVENTION

The present invention relates generally to embedded software, and particularly to frameworks for development of embedded software.

BACKGROUND OF THE INVENTION

Embedded software is an indispensable part of modern communication systems. Typically, every electronics card or other module in the system includes an embedded central processing unit (CPU), which is responsible for monitoring and controlling the performance of the module. Device driver software enables the CPU to communicate with the various hardware components on the card and to handle interrupts and other real-time events generated by the components. At a higher level, application handler software interacts with the device drivers and provides the CPU with the means to perform higher-level monitoring and control functions, such as configuration, performance monitoring, maintenance and alarm handling. To communicate with other modules and enable centralized management of the entire, multi-card system, the CPU must also comply with external interface requirements such as the Standard Network Management Protocol (SNMP) and use of a standard Management Information Base (MIB).

Developing the embedded software required for a complex system of electronics cards is a major engineering task. There are development tools on the market to assist in this task, by allowing common components to be reused from card to card. For example, at the device driver level, Jungo (Netanya, Israel) offers products named WinDriver (for Windows operating systems) and KernelDriver (for Linux kernel-based operating systems), which use a wizard to produce software code for bus-based hardware cards. The wizard asks the developer for standard resource locations, such as memory locations, interrupts, and registers located on the card. The product then outputs source code functions that allow the operating system to manipulate the resources.

At the system level, the Solstice TMN Agent Toolkit, available from Sun Microsystems Inc. (Palo Alto, Calif.), enables development of management agent software, in compliance with the Telecommunications Management Network (TMN) standard of the International Telecommunications Union (ITU-T). The agent acts as an interpreter and filter, sending commands to the network element it controls in order to get the data it requires. Agents thus encapsulate the interface between a hardware card and the MIB or SNMP network. The TMN Agent Toolkit consists of a core agent, containing a library of functions common to all agents. The core agent manages a MIB, to which it provides synchronous and asynchronous access. The toolkit also contains a compiler which accepts a formatted description of the hardware such as register location, memory configuration, and interrupt ports, and produces C-structures and skeleton callback functions which can be linked with the core agent. Application handler software, which is specific to the resources of the card to be managed by the agent, is left to be generated manually by the software developer.

SUMMARY OF THE INVENTION

It is an object of the present invention to provide improved tools for development of embedded software, particularly for use in communication systems.

It is a further object of some aspects of the present invention to provide methods for simplifying the development of embedded application handling software used in hardware cards and other modules in a communication system, as well as for enhancing the maintainability of this software.

Although standard tools are known in the art for generating low-level device drivers and for developing high-level management agents, developers of embedded software still need to build from scratch specific application handlers for each hardware module. Preferred embodiments of the present invention fill this gap by providing a set of generic application handlers for use in the hardware modules of a communication system. These handlers perform application functions that are common to substantially all of the modules in the system, such as configuration, alarm handling, performance monitoring and maintenance. The handlers also include an application program interface (API) for interfacing with one another and with a higher-level MIB handler and management agents.

Since the generic handlers provide the basic application functions required for any given module, the task of the software developer is reduced to tying the generic elements invoked by these functions to specific hardware components of the module. For this purpose, the developer produces a specific part of the application handler, linking the generic application functions to the specific device driver of the particular module. Besides reducing the amount of work that the software developer must do for each new card, this approach also enhances the maintainability of the embedded software by providing a unified, transparent structure for all the application handlers. It allows changes to be made in both the generic application functions and in the specific card features without the necessity of rewriting and debugging the entire application handler package. The developer is free to add other specific application handlers and functions, in addition to the standard package of generic handlers, if needed to address special features of a given module.

There is therefore provided, in accordance with a preferred embodiment of the present invention, a method for producing embedded software, including:

providing one or more generic application handler programs, each such program including computer program code for performing generic application functions common to multiple types of hardware modules used in a communication system;

generating specific application handler code to associate the generic application functions with specific functions of a device driver for at least one of the types of the hardware modules; and compiling the generic application handler programs together with the specific application handler code to produce machine-readable code to be executed by an embedded processor in the at least one of the types of the hardware modules.

Preferably, providing the generic application handler programs includes providing an application program interface (API) to enable a system management program in the communication system to invoke the generic application functions. Most preferably, the one or more generic application handler programs include a plurality of generic application programs, and providing the API includes enabling one of the generic application programs to invoke the generic application functions of another of the generic application programs.

In a preferred embodiment, providing the generic application handler programs includes providing a performance monitoring handler, including a performance monitoring function for counting selected events relating to performance of the hardware modules. Preferably, generating the specific application handler code includes specifying a register in one of the types of the hardware modules whose contents are to be passed to the performance monitoring function for counting. Further preferably, providing the performance monitoring handler includes providing a programmable performance threshold and an alarm invocation function, such that when a count of the selected events exceeds the threshold, the performance monitoring handler sends an alarm message to an alarm handler.

In another preferred embodiment, providing the generic application handler programs includes providing a maintenance handler, including a testing function for detecting failures in the hardware modules. Preferably, generating the specific application handler code includes associating the testing function with at least one of a self test and a sanity test of a component in the at least one of the types of the hardware modules. Further preferably, providing the maintenance handler includes providing an alarm invocation function, such that when one of the failures is detected, the maintenance handler sends an alarm message to an alarm handler.

In still another preferred embodiment, providing the generic application handler programs includes providing a configuration handler, for holding configuration and state information regarding components of the hardware modules.

In yet another preferred embodiment, providing the generic application handler programs includes providing an alarm handler, including functions for receiving and responding to alarm messages generated by others of the application handler programs. Preferably, providing the alarm handler includes providing a programmable prioritization function, for determining an order of priority for processing of the alarm messages by the alarm handler. Additionally or alternatively, generating the specific application handler code includes specifying a component in one of the types of the hardware modules to actuate so as to notify a user of the system of the alarm message. Further additionally or alternatively, generating the specific application handler code further includes specifying one of the generic application functions of another of the generic application handler programs to invoke in response to the alarm message. Preferably, responding to the alarm messages includes sending a notification of the alarm message from the alarm handler to a system management program.

Preferably, generating the specific application handler code includes defining specific elements to be handled by the generic application functions for the at least one of the types of the hardware modules, and registering one of the specific functions of the device driver for use in handing each of the defined specific elements.

There is also provided, in accordance with a preferred embodiment of the present invention, a hardware module for use in a communication system, belonging to a particular type of module among multiple types of hardware modules used in the communication system, the module including:

communication circuitry, including hardware components for processing communication signals;

an embedded central processing unit (CPU), coupled to control the components of the communication circuitry and to receive data therefrom; and a memory, containing machine-readable code for execution by the CPU, the machine-readable code having been generated by compiling together one or more generic application handler programs, each such program including computer program code for performing generic application functions common to the multiple types of hardware modules used in the communication system, along with specific application handler code prepared so as to associate the generic application functions with specific functions of a device driver for the particular type of module to which the hardware module belongs.

There is additionally provided, in accordance with a preferred embodiment of the present invention, a computer software product, including a computer-readable medium in which program code is stored, the code including one or more generic application handler programs, each such application handler program including program instructions for performing generic application functions common to multiple types of hardware modules used in a communication system, the generic application handler programs being arranged to be compiled together with specific application handler code prepared so as to associate the generic application functions with specific functions of a device driver for at least one of the types of the modules, thereby to produce machine-readable code to be executed by an embedded processor in the at least one of the types of the hardware modules.

The present invention will be more fully understood from the following detailed description of the preferred embodiments thereof, taken together with the drawings in which:

DETAILED DESCRIPTION OF PREFERRED EMBODIMENTS

Figure 1:
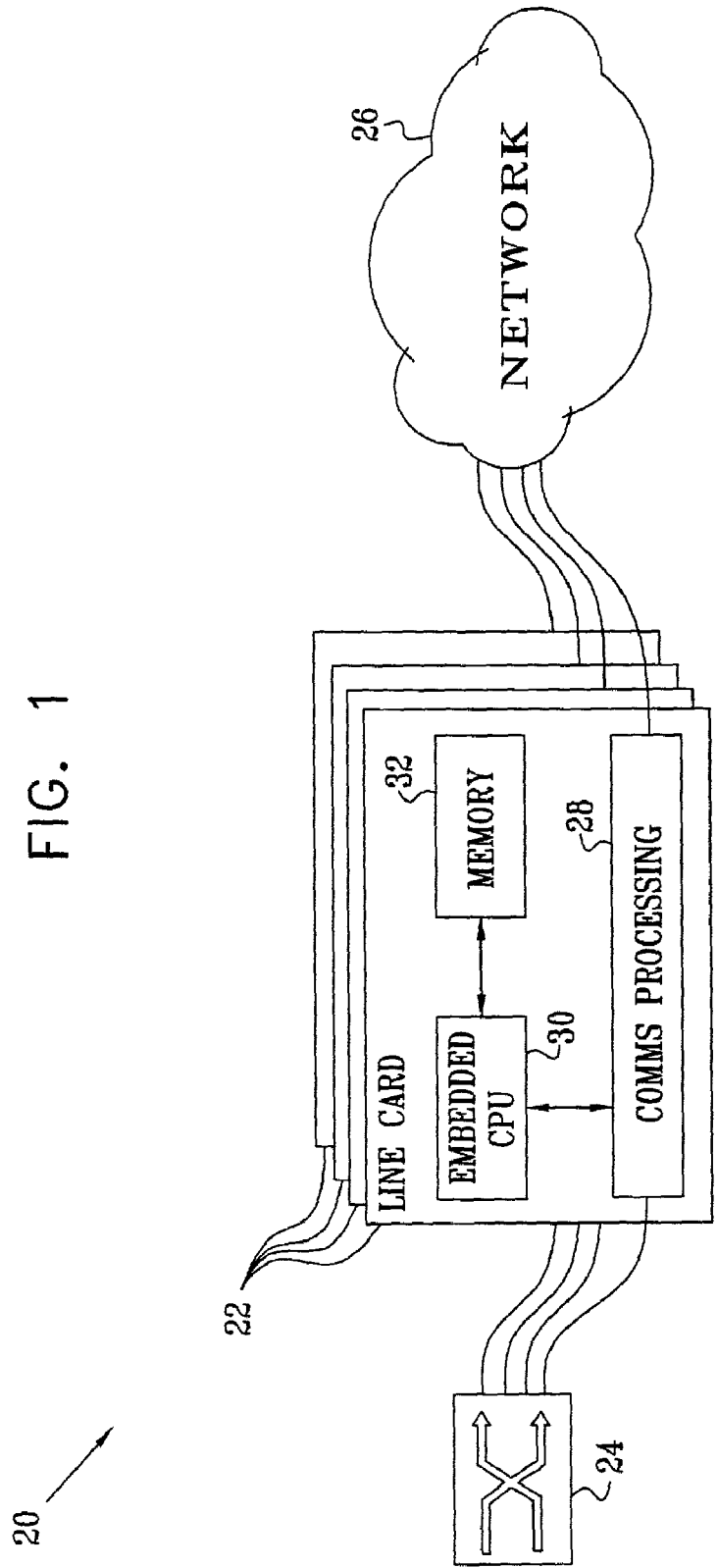
FIG. 1 is a block diagram that schematically illustrates a communication system with embedded software, in accordance with a preferred embodiment of the present invention.

FIG. 1 is a block diagram that schematically illustrates a communication system 20 with embedded software, in accordance with a preferred embodiment of the present invention. In the present example, system 20 comprises multiple line cards 22, which link a switch 24 to respective lines in a network 26. Each line card includes communication processing hardware 28, as is known in the art, including circuit components for processing communication signals and for performing other ancillary functions. An embedded CPU 30 on line card 22 monitors and controls aspects of the functioning of hardware 28, under the control of embedded software code stored in a memory 32. The code includes application handlers, as described in detail hereinbelow, along with device drivers and management software as are known in the art.

Typically, the embedded software stored in memory 32 is prepared by a programmer in a high-level language, and is then compiled into machine code for loading into the memory. To develop the application handler portion of the software, the programmer uses a set of generic application handlers, as described in detail hereinbelow. These generic handlers may be supplied to the programmer on tangible media, such as CD-ROM, or they may be downloaded over a network. The programmer adds specific code to the generic handlers for each different type of card in system 20, and the generic and specific codes are then compiled and linked together prior to being stored in memory 32.

Figure 2:
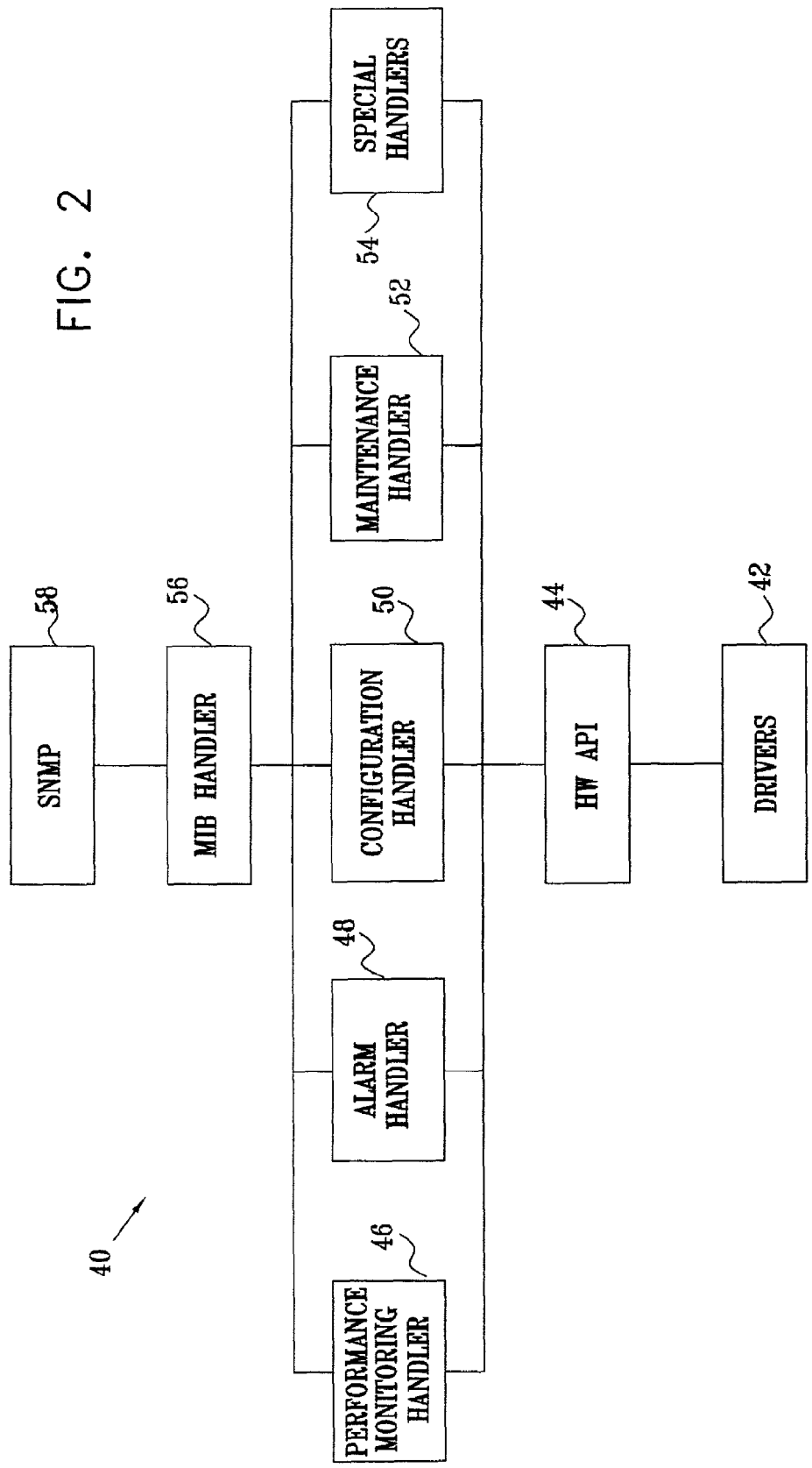
FIG. 2 is a block diagram that schematically illustrates an embedded software architecture that includes generic application handlers, in accordance with a preferred embodiment of the present invention.

FIG. 2 is a block diagram that schematically illustrates the architecture of the embedded software code used in card 22, in accordance with a preferred embodiment of the present invention. At the lowest level, the embedded code includes device drivers 42, which typically provide a hardware API 44 for use by application handlers 40. The application handlers have a software API for communicating with one another, as well as with a central Management Information Base (MID) handler 56 and with upper-level system management software 58. The management software interface preferably complies with applicable standards for communication system management, such as the Simple Network Management Protocol (SNMP).

Application handlers 40 include the following generic handlers, which are common to substantially all the different types of cards used in system 20:

A performance monitoring (PM) handler 46 includes a timer that activates functions defined by the programmer at selected time intervals. These functions include reading the values of counters maintained by hardware 28 and updating a database accordingly, as well as generating an alarm message when a given counter passes a preset threshold.

An alarm handler 48—receives alarm messages from PM handler 46 and from other elements, and actuates appropriate responses as defined by the programmer. For example, a loss of signal by one of the components of hardware 28 is reported to the alarm handler, which then turns on an alarm LED (in hardware 28) and sends a message to the management software. The alarm handler also includes an alarm priority mechanism, based on priorities set by the programmer.

A configuration handler 50—maintains a central database holding configuration and state information regarding the components of hardware 28, interfaces and card 22 generally. The configuration handler maps "set" and "get" commands received from higher software layers to appropriate calls via hardware API 44 to specific hardware components. Because it provides a fixed and tested framework for configuration control, the configuration manager forces the programmer to work in a known, logical structure and prevents database corruption. It also enables the programmer to assign a test function to be activated automatically before changing a setting and/or an action function to take place after the change.

A maintenance handler 52—includes common test functions, such as startup self test and intermittent sanity tests, performed at intervals set by the programmer. The maintenance handler also performs general maintenance functions invoked according to instructions by the programmer, such as looping-back the output of a module to its input.

In addition to these generic handlers, the programmer may choose to add special handlers 54 for some cards in system 20, for performing particular application functions that do not fall within the bounds of the supplied generic handlers. Alternatively or additionally, the set of generic handlers may be expanded to include other functions, such as a protection handler for backing up communication links in the event of a failure.

Figure 3A:
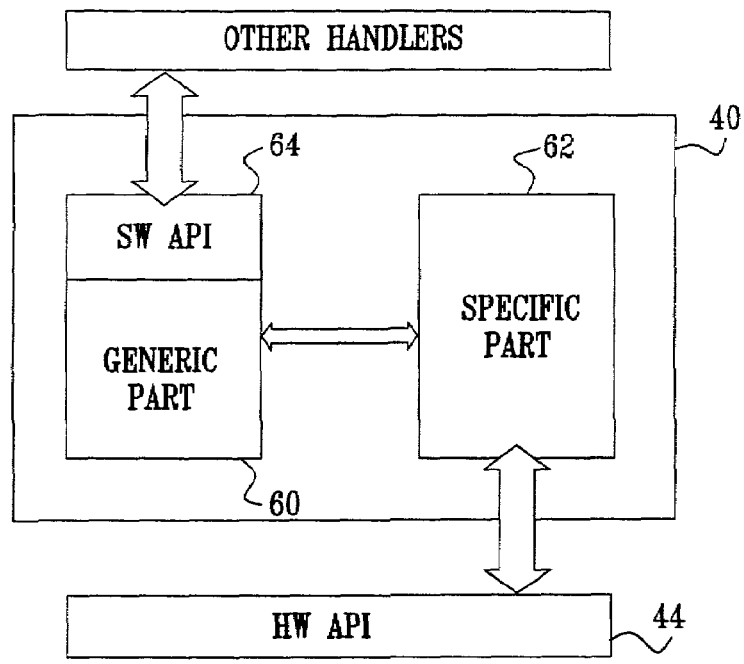
FIG. 3A is a block diagram that schematically shows details of the structure of a generic application handler, in accordance with a preferred embodiment of the present invention.

FIG. 3A is a block diagram that schematically illustrates a prototypical structure of one of generic handlers 40, in accordance with a preferred embodiment of the present invention. Handler 40 comprises a generic part 60 and a specific part 62. The generic part includes the application functions that are common to all of cards 22 (although not all the functions must necessarily be used on all of the cards). The generic part is supplied as a fixed, standard package to the programmer who must prepare the embedded software for cards 22. Generic part 60 also includes a software API, which allows the other handlers and management software to interact with handler 40 in a uniform, generic way, independent of the type of hardware and device driver 42 behind the handler. Specific part 62 is written for each type of card 22 by the programmer so as to link the standard functions and parameters of generic part 60 with the specific device driver for this card via its hardware API 44. This is the only part of handler 40 that is hardware-dependent.

Figure 3B:
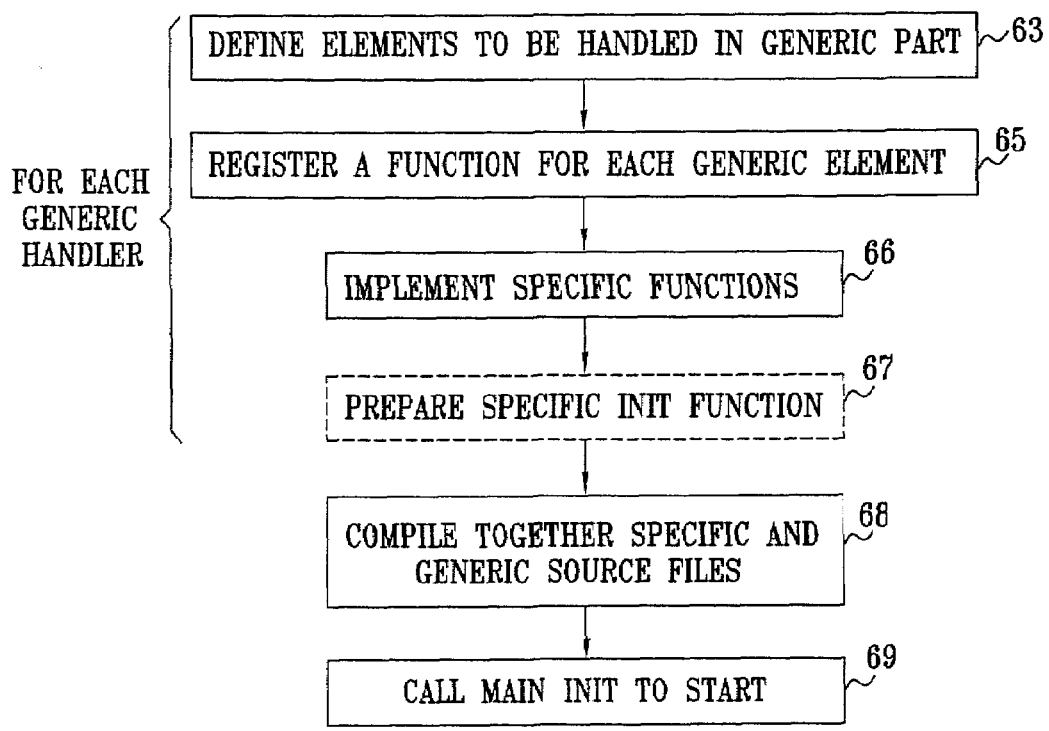
FIG. 3B is a flow chart that schematically illustrates a method for developing application handlers based on the structure of FIG. 3A, in accordance with a preferred embodiment of the present invention.

FIG. 3B is a flow chart that schematically illustrates a method for creating the complete handler 40 starting from its supplied generic part 60, in accordance with a preferred embodiment of the present invention. For each different generic handler, the programmer performs the following steps:

Define the element types (or events) to be handled by the functions provided by generic part 60, at an element definition step 63. For PM handler 46, for instance, the programmer defines the counters to be collected and monitored, while for alarm handler 48, the different alarm types are defined. For maintenance handler 52, the elements to be defined are the tests to be carried out (self test, sanity test, etc.), as well as other general maintenance functions. As an example, the following C-language code defines a typical test sequence to be carried out by maintenance handler 52 at power on:

```
typedef enum
{
    EV_SELFTEST_CPU,
    EV_SELFTEST_FPGA,
    EV_SELFTEST_LAST
} E_MAINT_SELFTEST;
```

For each element type to be used in the generic part of the handler, register a function in specific part 62 that will be used to handle the element, at a registration step 65. For instance, for "ALARM_TYPE_1" of alarm handler 48, register the function that will perform all the actions to be taken as a consequence of this alarm. For each maintenance self test, register the function that exercises the appropriate hardware component and returns the result, for example:

```
void registerMaintFunctions(void)
{
    setSelfTestElement(EV_SELFTEST_CPU,
        (void*)selfTestCPU);
    setSelfTestElement(EV_SELFTEST_FPGA,
        (void*)selfTestFPGA);
    setSanityTestElement(EV_SANITYTEST_RAM,
        (void*)sanityTestRAM1, HANDLER_ALARM_DUMMY1);
    setGeneralFuncElement(EV_GEN_LOOPBACK,
        (void*)doLoopBack);
} //End of registerMaintFunctions
```

In the sample code listed above, a failure in the RAM sanity test will cause the alarm type HANDLER_ALARM__DUMMY1 to be automatically invoked by maintenance handler 52. In this event, generic part 60 of the maintenance handler passes a message to software API 64 of alarm handler 48. This alarm is registered with the alarm handler by the following sample code:

```
Void registerAlarmFunctions(void)
{
    setAlarmFunction (HANDLER_ALARM_DUMMY1_ON,
        (void*)AlarmFunctionOneOn);
    setAlarmFunction(HANDLER_ALARM_DUMMY1_OFF,
        (void*)AlarmFunctionOneOff);
}
```

Preferably, generic part 60 of the alarm handler supports two functions for each alarm type: alarm on and alarm off, as illustrated by the sample code.

Implement the specific functions in source code, at an implementation step 66.

Prepare a specific "init" function, to initialize elements of specific part 62, at an init preparation step 67. This step, which is optional, is described in greater detail below with reference to FIG. 7. Generic part 60 of each handler 40 also includes an init function, which is called (typically at power-up) to initiate the data structures and mechanisms used by the handler, in accordance with the events defined and registered by the programmer.

To use the handlers, the programmer compiles generic parts 60 together with specific parts 62, at a compilation step 68. To run the handlers, a MAIN_Init function in the main part of the embedded code calls the init functions of the generic handlers, at an initialization step 69. The initialization process is described below with reference to FIG. 7.

The Appendix to this patent application provides a source code listing of programs and data structures used in generic part 60, along with a typical implementation of specific part 62. Files in the Appendix named "genXXXX.cpp" are the generic parts of a number of different handlers, whose functionality and structure are described in detail with reference to the figures that follow. Files named "XXXX.h" are used to define the element types for each handler. Files named "XXXX.cpp," without the "gen" prefix, contain the specific functions for each handler, which must be written by the programmer for each individual hardware module. By following the steps in the method of FIG. 3B, the programmer will be able to adapt the handlers in the Appendix to suit a wide range of different types of communication cards and other hardware modules.

Figure 4:
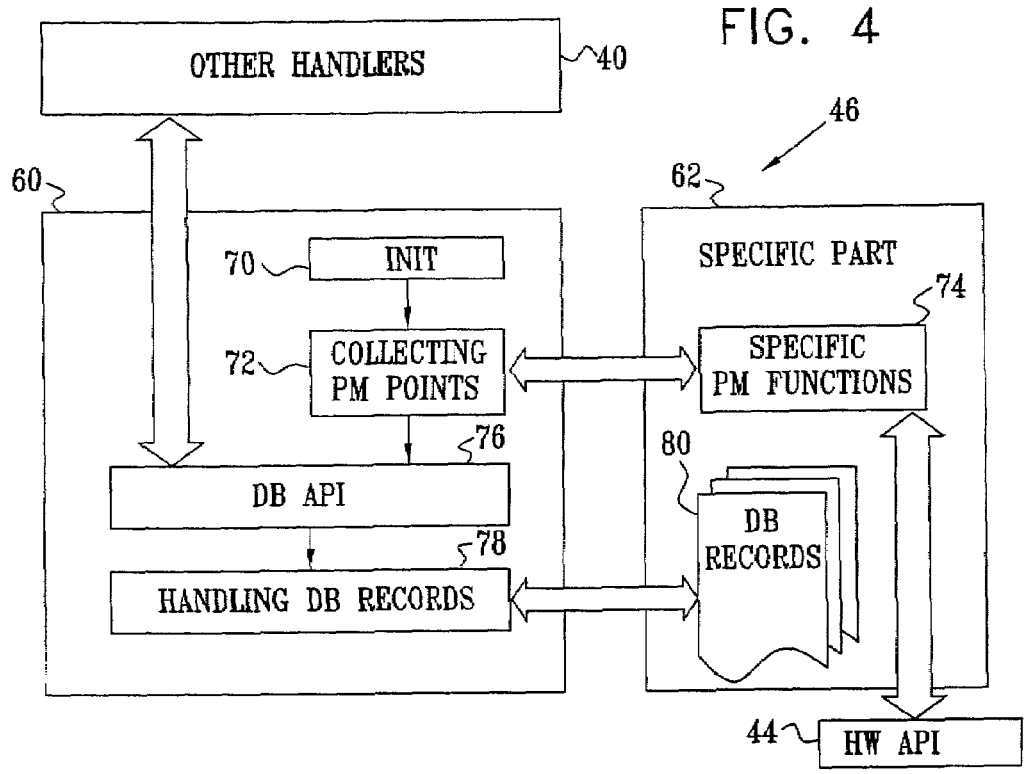
FIG. 4 is a block diagram that schematically illustrates the structure of a generic performance monitoring handler, in accordance with a preferred embodiment of the present invention.

FIG. 4 is a block diagram that schematically shows details of performance monitoring (PM) handler 46, in accordance with a preferred embodiment of the present invention. The main tasks performed by the PM handler include polling hardware 28 every T seconds to collect data (either directly from hardware registers or by calculation); maintaining a database containing the current data values and past values over N previous collection intervals; and activating alarms when data values are outside acceptable ranges. Generic part 60 of PM handler 46 includes an init function 70, as mentioned above, which initiates collection functions 72 for collecting the PM data (or "points") specified by the programmer. Generic functions 72 are registered with specific PM functions 74, which are written by the programmer to collect the specified data via hardware API 44.

A database API 76 receives the data collected by collection functions 72 and passes the data to a database handling function 78, which accesses database records 80. These records are created by the programmer specifically for card 22. Alternatively, a generic or global database can be defined and used for this purpose. API 76 also acts as a software API to the other application handlers, for purposes such as sending alarm messages to alarm handler 48. In addition, the other application handlers and higher-level management functions can use API 76 to get and reset values held in database records 80.

Figure 5:
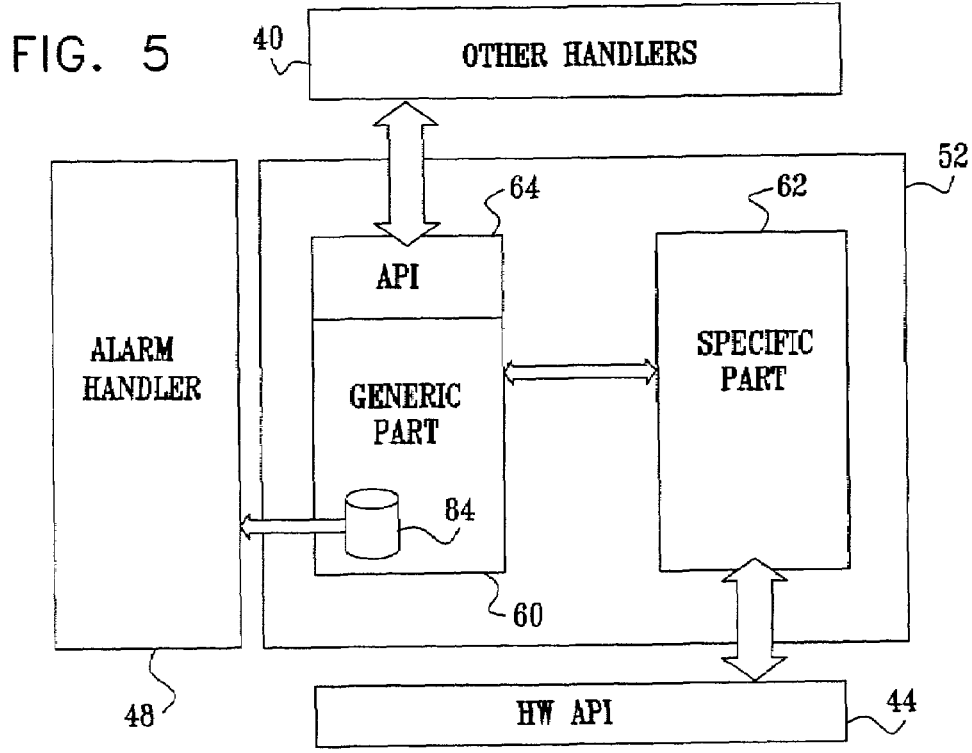
FIG. 5 is a block diagram that schematically illustrates the structure of a generic maintenance handler, in accordance with a preferred embodiment of the present invention.

FIG. 5 is a block diagram that schematically shows details of maintenance handler 52, in accordance with a preferred embodiment of the present invention. As mentioned above, the functions of the maintenance handler include self testing (of individual components or the entire card) and periodic sanity testing of the hardware components. If a sanity test fails, or some other hardware failure is detected, an alarm generator 84 provided by generic part Go of the maintenance handler sends an appropriate message to alarm handler 48 via the software APIs of the maintenance and alarm handlers. The generic part of the maintenance handler uses the appropriate API function of the alarm handler to invoke the type of alarm that was registered by the programmer for the maintenance test in question. In this way, the generic parts of the different handlers communicate with one another without the need for any further coding by the programmer (beyond filling in the specific, typically hardware-oriented parts of the handlers).

Maintenance handler 52 also performs general maintenance functions, which can be invoked by other handlers and by management software via API 64. The API enables these other entities to get the status of hardware tests performed by the maintenance handler and to invoke general maintenance functions such as loop-back and signal/noise ratio measurements. A prototypical API function for this purpose has the form:

CS_INT8 MAINT_CallFunc(E_GENERALFUNC,
    void*, void*, void*, void*);

To invoke a loop-back function of the maintenance handler, with the parameters linkNum and loopbackType, for example, the alarm handler will use the API call:

MAINT_CallFunc(EV_GEN_LOOPBACK, int*
    linkNum, int* loopbackType);

(Here it is assumed that the loop-back function doLoopBack was previously registered for the event EV_GEN_LOOPBACK, as described above.)

Figure 6:
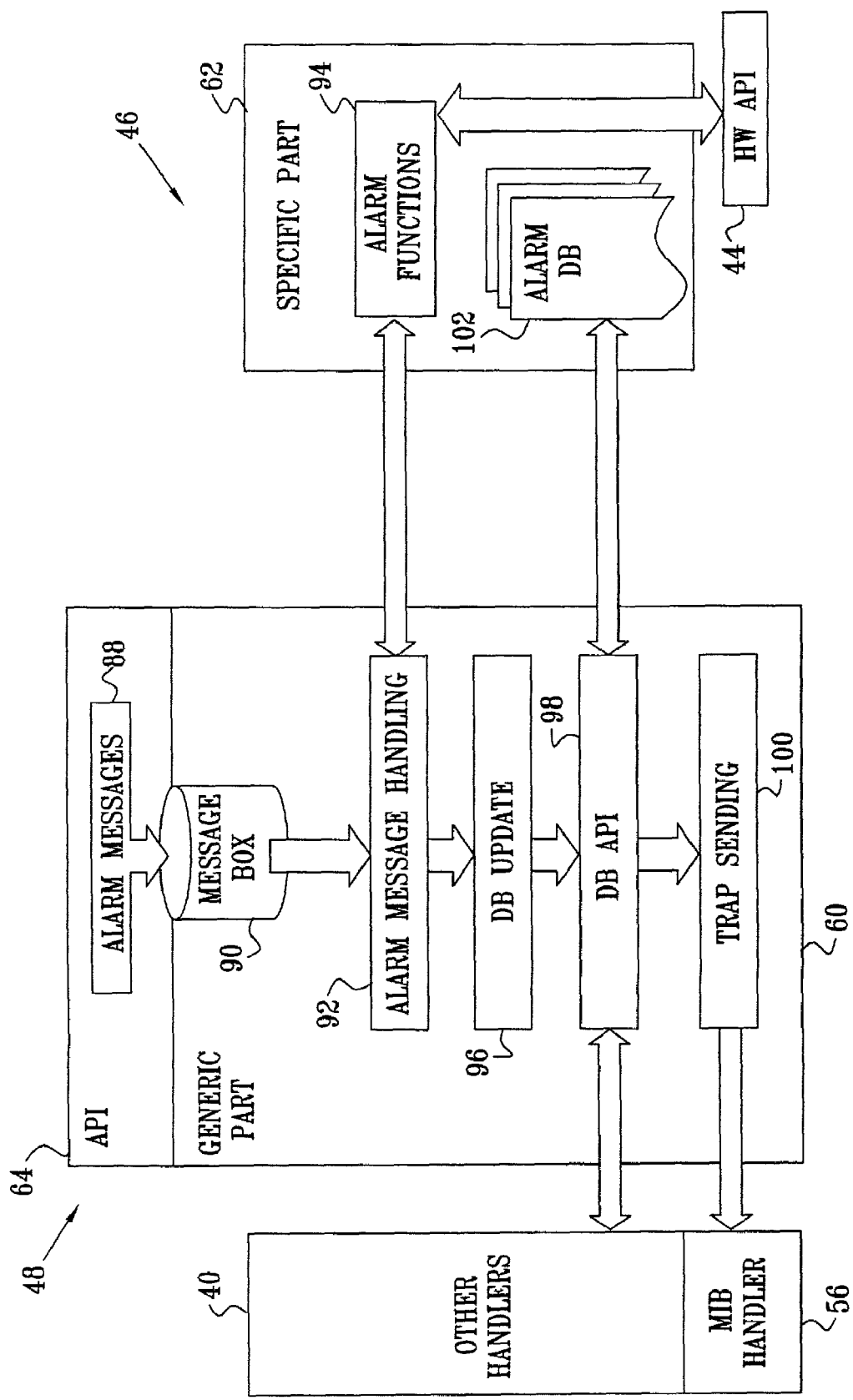
FIG. 6 is a block diagram that schematically illustrates the structure of a generic alarm handler, in accordance with a preferred embodiment of the present invention.

FIG. 6 is a block diagram that schematically shows details of alarm handler 48, in accordance with a preferred embodiment of the present invention. The alarm handler receives alarm messages 88 from other application handlers via its API 64, and places the alarms in a "message box" queue 90. Generic part 60 of the alarm handler includes an alarm message handler 92, which reads and processes the messages according to an alarm priority ordering defined by the programmer. Each alarm message type invokes a generic alarm function, which is registered with a specific alarm function 94 by the user. As described above, the specific alarm functions activate designated elements of hardware 28 via hardware API 44, and they may also call functions provided by other application handlers. An example of this sort of interaction is described below with reference to FIG. 8.

A further function of alarm handler 48 is to maintain a database 102 of the alarm status on card 22, indicating which alarms have occurred and have been reported, as well as which alarms are enabled or disabled. (As noted above, a global or generic database may also be used.) Message handler 92 passes alarm information to a database update function 96, which updates database 102 as required using a database API 98. The database API also enables the other handlers and management software to access the information in the alarm database. In addition to the local alarm handling functions 94 defined by specific part 62 of alarm handler 48, the alarm handler can also be programmed to notify the management software when certain types of alarms occur, or when any alarm occurs. This notification is preferably generated by a trap sending function 100, which sends an appropriate trap message to MIB handler 56, in accordance with SNMP convention.

Figure 7:
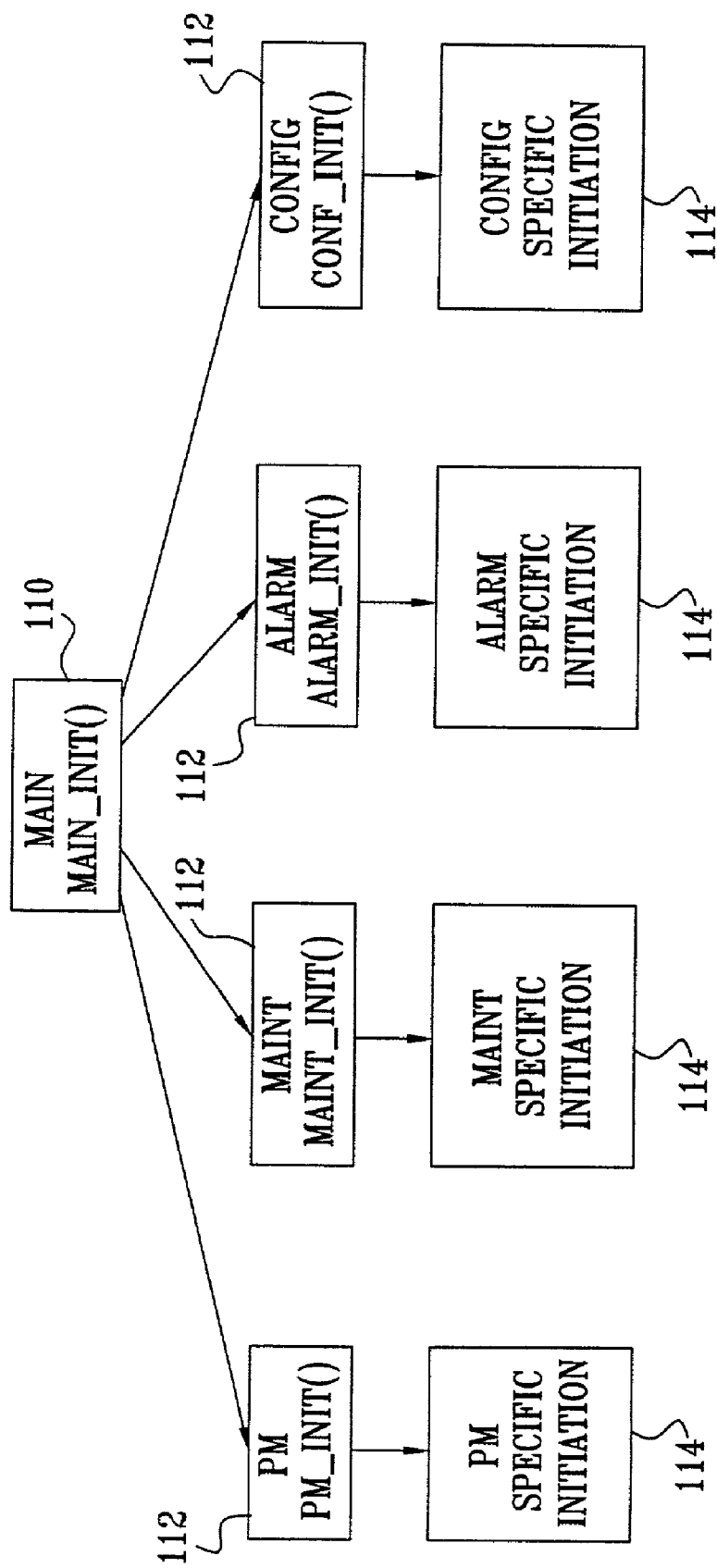
FIG. 7 is a flow chart that schematically illustrates a procedure for initialization of a set of generic application handlers, in accordance with a preferred embodiment of the present invention.

FIG. 7 is a flow chart that schematically illustrates a method for initialization of handlers 40, in accordance with a preferred embodiment of the present invention. This initialization procedure is typically invoked at system start-up. The main loop of the embedded software running on CPU 30 includes a call to a MAIN_INIT( ) function, at a system initialization step 110. MAIN_INIT( ) invokes the init functions provided by generic part 60 of each of application handlers 40 (such as PM_INIT( ), MAINT_INIT( ), etc.), at a handler generic initialization step 112. When each of the generic init functions runs, it initializes the events types and the generic functions to be performed by the handler. Each of the generic init functions preferably includes a call to an additional init stub function in the specific part of the handler. The init stub is prepared by the programmer as part of the specific source file of the handler. It is used to perform optional, specific initialization functions at power-on of the module, at a handler specific initialization step 114.

Figure 8:
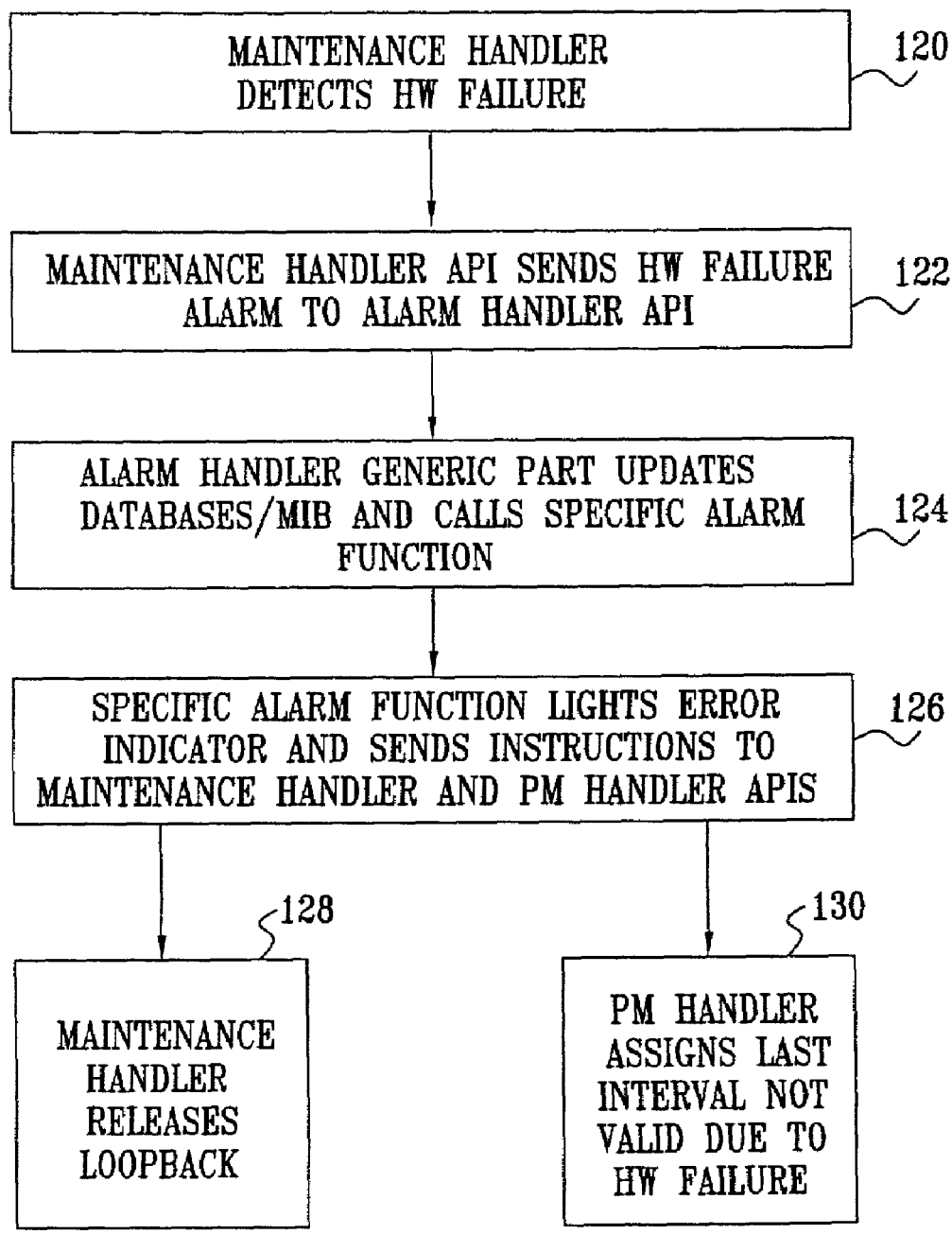
FIG. 8 is a flow chart that schematically illustrates a method for handling a hardware failure, in accordance with a preferred embodiment of the present invention.

FIG. 8 is a flow chart that schematically illustrates a method for handling a hardware failure using handlers 40, in accordance with a preferred embodiment of the present invention. This method is described here in order to exemplify the interactions between the different handlers and the hardware on card 22 and draws on features of the handlers described above. In this example, the method begins when maintenance handler 52 detects a hardware failure, in a periodic sanity test, for instance, at a failure detection step 120. By the same token, the method could be triggered by PM handler 46, upon detecting that a given hardware counter, such as a CRC error counter, is over threshold.

As illustrated in the sample code above, detection of the hardware failure causes maintenance handler 52 to send an alarm message from its software API 64 to the software API of alarm handler 48, at an alarm sending step 122. Generic part 60 of the alarm handler processes the message in the manner specified by the programmer for this type of alarm, at a generic alarm processing step 124. The processing typically includes updating alarm database 102 and sending an appropriate trap packet to MIB handler 56.

The generic alarm handler also invokes the specific alarm functions 94 that have been registered by the programmer for this type of alarm, at a specific alarm processing step 126. In the present example, this specific processing includes lighting an error indication LED on card 22 and passing appropriate messages to API 64 of maintenance handler 52 and of PM handler 46. The message to maintenance handler 52 instructs it to release the loop-back in hardware 28 for an interface associated with the hardware failure, at a loop-back release step 128. The message to PM handler 46 instructs it to mark the last interval in its database 80 as invalid, so that the monitoring results are not distorted by the hardware failure that occurred. At this point, handling of the hardware failure is complete.

Although preferred embodiments are described hereinabove with specific reference to line cards 22 used in system 20, the principles of the generic application handlers described hereinabove are equally applicable to hardware modules of other types used in substantially any sort of communication system. Furthermore, although these preferred embodiments are drawn to certain particular types of generic handlers, the extension of the principles of the present invention to other types of generic handlers will be clear to those skilled in the art, based on the examples described above.

It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for producing embedded software, comprising:

providing one or more generic application handler programs, each such program comprising computer program code for performing generic application functions common to multiple types of hardware modules used in a communication system;

generating specific application handler code to associate the generic application functions with specific functions of a device driver for at least one of the types of the hardware modules, wherein generating the specific application handler code comprises defining a specific element in the specific application handler code to be handled by one of the generic application functions for the at least one of the types of the hardware modules, and registering one of the specific functions of the device driver for use in handing the defined specific element; and compiling the generic application handler programs together with the specific application handler code to produce machine-readable code to be executed by an embedded processor in the at least one of the types of the hardware modules.

2. A method according to claim 1, wherein providing the generic application handler programs comprises providing an application program interface (API) to enable a system management program in the communication system to invoke the generic application functions.

3. A method according to claim 2, wherein the one or more generic application handler programs comprise a plurality of generic application programs, and wherein providing the API comprises enabling one of the generic application programs to invoke the generic application functions of another of the generic application programs.

4. A method according to claim 1, wherein providing the generic application handler programs comprises providing a performance monitoring handler, including a performance monitoring function for counting selected events relating to performance of the hardware modules.

5. A method according to claim 4, wherein generating the specific application handler code comprises specifying a register in one of the types of the hardware modules whose contents are to be passed to the performance monitoring function for counting.

6. A method according to claim 4, wherein providing the generic application handler programs further comprises providing an alarm handler, and wherein providing the performance monitoring handler comprises providing a programmable performance threshold and an alarm invocation function, such that when a count of the selected events exceeds the threshold, the performance monitoring handler sends an alarm message to the alarm handler.

7. A method according to claim 1, wherein providing the generic application handler programs comprises providing a maintenance handler, including a testing function for detecting failures in the hardware modules.

8. A method according to claim 7, wherein generating the specific application handler code comprises associating the testing function with at least one of a self test and a sanity test of a component in the at least one of the types of the hardware modules.

9. A method according to claim 7, wherein providing the generic application handler programs further comprises providing an alarm handler, and wherein providing the maintenance handler comprises providing an alarm invocation function, such that when one of the failures is detected, the maintenance handler sends an alarm message to the alarm handler.

10. A method according to claim 1, wherein providing the generic application handler programs comprises providing a configuration handler, for holding configuration and state information regarding components of the hardware modules.

11. A method according to claim 1, wherein providing the generic application handler programs comprises providing an alarm handler, including functions for receiving and responding to alarm messages generated by others of the application handler programs.

12. A method according to claim 11, wherein providing the alarm handler comprises providing a programmable prioritization function, for determining an order of priority for processing of the alarm messages by the alarm handler.

13. A method according to claim 11, wherein generating the specific application handler code comprises specifying a component in one of the types of the hardware modules to actuate so as to notify a user of the system of the alarm message.

14. A method according to claim 11, wherein generating the specific application handler code further comprises specifying one of the generic application functions of another of the generic application handler programs to invoke in response to the alarm message.

15. A method according to claim 11, wherein responding to the alarm messages comprises sending a notification of the alarm message from the alarm handler to a system management program.

16. A hardware module for use in a communication system, belonging to a particular type of module among multiple types of hardware modules used in the communication system, the module comprising:

communication circuitry, comprising hardware components for processing communication signals;

an embedded central processing unit (CPU), coupled to control the components of the communication circuitry and to receive data therefrom; and a memory, containing machine-readable code for execution by the CPU, the machine-readable code having been generated by compiling together one or more generic application handler programs, each such program comprising computer program code for performing generic application functions common to the multiple types of hardware modules used in the communication system, along with specific application handler code prepared so as to associate the generic application functions with specific functions of a device driver for the particular type of module to which the hardware module belongs, wherein the specific application handler code defines a specific element in the specific application handler code to be handled by one of the generic application functions for the particular type of the hardware module, and registers one of the specific functions of the device driver for use in handing the defined specific elements.

17. A module according to claim 16, wherein the generic application handler programs comprise an application program interface (API) to enable a system management program in the communication system to invoke the generic application functions.

18. A module according to claim 17, wherein the one or more generic application handler programs comprise a plurality of generic application programs, and wherein the API enables one of the generic application programs to invoke the generic application functions of another of the generic application programs.

19. A module according to claim 16, wherein the generic application handler programs comprise a performance monitoring handler, including a performance monitoring function for counting selected events relating to performance of the hardware modules.

20. A module according to claim 19, wherein the specific application handler code specifies a register in one of the types of the hardware modules whose contents are to be passed to the performance monitoring function for counting.

21. A module according to claim 19, wherein the generic application handler programs further comprise an alarm handler, and wherein the performance monitoring handler provides a programmable performance threshold and an alarm invocation function, such that when a count of the selected events exceeds the threshold, the performance monitoring handler sends an alarm message to the alarm handler.

22. A module according to claim 16, wherein the generic application handler programs comprise a maintenance handler, including a testing function for detecting failures in the hardware modules.

23. A module according to claim 22, wherein the specific application handler code associates the testing function with at least one of a self test and a sanity test of one of the hardware components in the hardware module.

24. A module according to claim 22, wherein the generic application handler programs further comprise an alarm handler, and wherein the maintenance handler provides an alarm invocation function, such that when one of the failures is detected, the maintenance handler sends an alarm message to the alarm handler.

25. A module according to claim 16, wherein the generic application handler programs comprise a configuration handler, for holding configuration and state information regarding the hardware components.

26. A module according to claim 16, wherein the generic application handler programs comprise an alarm handler, including functions for receiving and responding to alarm messages generated by others of the application handler programs.

27. A module according to claim 26, wherein the alarm handler comprises a programmable prioritization function, for determining an order of priority for processing of the alarm messages by the alarm handler.

28. A module according to claim 26, wherein the specific application handler code specifies a component in one of the types of the hardware modules to actuate so as to notify a user of the system of the alarm message.

29. A module according to claim 26, wherein the specific application handler code further specifies one of the generic application functions of another of the generic application handler programs to invoke in response to the alarm message.

30. A module according to claim 26, wherein the alarm handler causes the CPU to send a notification of the alarm message to a system management program.

31. A computer software product, comprising a computer-readable medium in which program code is stored, the code comprising one or more generic application handler programs, each such application handler program comprising program instructions for performing generic application functions common to multiple types of hardware modules used in a communication system, the generic application handler programs being arranged to be compiled together with specific application handler code prepared so as to associate the generic application functions with specific functions of a device driver for at least one of the types of the modules, thereby to produce machine-readable code to be executed by an embedded processor in the at least one of the types of the hardware modules, wherein the specific application handler code defines a specific element in the specific application handler code to be handled by one of the generic application functions for the particular type of the hardware module, and registers one of the specific functions of the device driver for use in handing the defined specific elements.

32. A product according to claim 31, wherein the generic application handler programs comprise an application program interface (API) to enable a system management program in the communication system to invoke the generic application functions.

33. A product according to claim 32, wherein the one or more generic application handler programs comprise a plurality of generic application programs, and wherein the API enables one of the generic application programs to invoke the generic application functions of another of the generic application programs.

34. A product according to claim 31, wherein the generic application handler programs comprise a performance monitoring handler, including a performance monitoring function for counting selected events relating to performance of the hardware modules.

35. A product according to claim 34, wherein the specific application handler code specifies a register in one of the types of the hardware modules whose contents are to be passed to the performance monitoring function for counting.

36. A product according to claim 34, wherein the generic application handler programs further comprise an alarm handler, and wherein the performance monitoring handler provides a programmable performance threshold and an alarm invocation function, such that when a count of the selected events exceeds the threshold, the performance monitoring handler sends an alarm message to the alarm handler.

37. A product according to claim 31, wherein the generic application handler programs comprise a maintenance handler, including a testing function for detecting failures in the hardware modules.

38. A product according to claim 37, wherein the specific application handler code associates the testing function with at least one of a self test and a sanity test of one of the hardware components in the hardware module.

39. A product according to claim 37, wherein the generic application handler programs further comprise an alarm handler, and wherein the maintenance handler provides an alarm invocation function, such that when one of the failures is detected, the maintenance handler sends an alarm message to the alarm handler.

40. A product according to claim 31, wherein the generic application handler programs comprise a configuration handler, for holding configuration and state information regarding the hardware components.

41. A product according to claim 31, wherein the generic application handler programs comprise an alarm handler, including functions for receiving and responding to alarm messages generated by others of the application handler programs.

42. A product according to claim 41, wherein the alarm handler comprises a programmable prioritization function, for determining an order of priority for processing of the alarm messages by the alarm handler.

43. A product according to claim 41, wherein the specific application handler code specifies a component in one of the types of the hardware modules to actuate so as to notify a user of the system of the alarm message.

44. A product according to claim 41, wherein the specific application handler code further specifies one of the generic application functions of another of the generic application handler programs to invoke in response to the alarm message.

45. A product according to claim 41, wherein when the code is executed by the embedded processor, the alarm handler causes the processor to send a notification of the alarm message to a system management program.

* * * * *